US010427336B2

(12) United States Patent
Yu et al.

(10) Patent No.: US 10,427,336 B2
(45) Date of Patent: *Oct. 1, 2019

(54) PERIODIC STRUCTURED COMPOSITE AND ARTICLES THEREFROM

(71) Applicants: Chengjiao Yu, Houston, TX (US); Zhiyue Xu, Cypress, TX (US)

(72) Inventors: Chengjiao Yu, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 640 days.

This patent is subject to a terminal disclaimer.

(21) Appl. No.: 14/548,610

(22) Filed: Nov. 20, 2014

(65) Prior Publication Data

US 2016/0145961 A1 May 26, 2016

(51) Int. Cl.
*B29C 44/12* (2006.01)
*E21B 33/12* (2006.01)
(Continued)

(52) U.S. Cl.
CPC ...... *B29C 44/1276* (2013.01); *E21B 33/1208* (2013.01); *E21B 41/00* (2013.01); *B29K 2101/10* (2013.01); *B29L 2031/14* (2013.01)

(58) Field of Classification Search
CPC .................. B29C 44/1276; E21B 33/1208
See application file for complete search history.

(56) References Cited

U.S. PATENT DOCUMENTS

| 2,138,787 A | 11/1938 | Gottschalk et al. |
| 2,240,185 A | 4/1941 | Hennessy |
(Continued)

FOREIGN PATENT DOCUMENTS

| CN | 1382577 | 12/2002 |
| CN | 1480276 A | 3/2004 |
(Continued)

OTHER PUBLICATIONS

PCT International Search Report and Written Opinion; International Application No. PCT/US2016/057068; International Filing Date: Oct. 14, 2016; dated Jan. 24, 2017; pp. 1-13.
(Continued)

*Primary Examiner* — Hai Vo
(74) *Attorney, Agent, or Firm* — Cantor Colburn LLP

(57) ABSTRACT

In one aspect, a material is disclosed, including: a periodic structure including a plurality of unit cells, the plurality of unit cells having a respective plurality of shared nodes, wherein each of the plurality of unit cells has a plurality of members forming an open cell volume; and a matrix material associated with the periodic structure. In another aspect, a method of forming a material is disclosed, including: forming a periodic structure including a plurality of unit cells, the plurality of unit cells having a respective plurality of shared nodes, wherein each of the plurality of unit cells has a plurality of members forming an open cell volume; and associating a matrix material with the periodic structure. Matrix material selection, composition, manufacturing, interfacial bonding modification, and post-treatments of the periodic structure-matrix material composites are disclosed.

9 Claims, 4 Drawing Sheets

(51) Int. Cl.
*E21B 41/00* (2006.01)
*B29K 101/10* (2006.01)
*B29L 31/14* (2006.01)

(56) References Cited

U.S. PATENT DOCUMENTS

| | | | |
|---|---|---|---|
| 2,439,424 A | 4/1948 | Goodloe et al. | |
| 2,450,280 A | 9/1948 | Homon | |
| 5,660,917 A | 8/1997 | Fujimori et al. | |
| 5,861,203 A * | 1/1999 | Yuan | B29C 43/006 428/117 |
| 6,098,989 A | 8/2000 | Caplain et al. | |
| 6,352,264 B1 | 3/2002 | Dalzell, Jr. et al. | |
| 8,197,930 B1 | 6/2012 | Jacobsen et al. | |
| 8,230,913 B2 * | 7/2012 | Hart | E21B 33/1208 166/207 |
| 8,320,727 B1 * | 11/2012 | Jacobsen | B29D 11/00663 264/1.24 |
| 8,354,170 B1 | 1/2013 | Henry et al. | |
| 9,527,261 B1 * | 12/2016 | Roper | F16L 41/00 |
| 9,726,300 B2 | 8/2017 | Zhao et al. | |
| 2004/0146736 A1 | 7/2004 | Ivanov et al. | |
| 2005/0039992 A1 | 2/2005 | Hurwic | |
| 2005/0109502 A1 | 5/2005 | Slay et al. | |
| 2006/0080835 A1 * | 4/2006 | Kooistra | B21D 31/043 29/897.34 |
| 2011/0079962 A1 | 4/2011 | Munro et al. | |
| 2011/0176757 A1 * | 7/2011 | Heldmann | F16C 27/02 384/29 |
| 2011/0193217 A1 | 8/2011 | Meyer-Berg | |
| 2012/0031616 A1 * | 2/2012 | Hall | E21B 17/00 166/302 |
| 2013/0220644 A1 * | 8/2013 | Fripp | E21B 33/1208 166/387 |
| 2013/0228099 A1 * | 9/2013 | Soba | C22C 14/00 106/286.4 |
| 2013/0300066 A1 | 11/2013 | Xu et al. | |
| 2016/0046095 A1 * | 2/2016 | Clough | B32B 3/12 181/286 |
| 2016/0069141 A1 * | 3/2016 | Blackmon | E21B 17/1035 166/380 |
| 2016/0145961 A1 | 5/2016 | Yu et al. | |
| 2016/0288200 A1 | 10/2016 | Xu et al. | |

FOREIGN PATENT DOCUMENTS

| | | |
|---|---|---|
| CN | 101285135 A | 10/2008 |
| CN | 101286714 A | 10/2008 |
| CN | 201613676 U | 10/2010 |
| CN | 102433010 A | 5/2012 |
| CN | 102598892 A | 7/2012 |
| CN | 103937224 A | 7/2014 |
| CN | 103962479 | 8/2014 |
| CN | 104325652 A | 2/2015 |
| EP | 1607653 | 12/2005 |
| RU | 2011460 | 4/1994 |
| RU | 2195381 | 12/2002 |
| RU | 2199413 | 2/2003 |
| RU | 2208496 | 7/2003 |
| SU | 1163951 | 6/1985 |
| SU | 1210944 | 2/1986 |
| SU | 1785474 | 12/1992 |

OTHER PUBLICATIONS

Courtois et al., "Mechanical Properties of Monofilament Entangled Materials", Advanced Engineering Materials, vol. 14, No. 12, 2012, pp. 1128-1133.

PCT International Search Report and Written Opinion; International Application No. PCT/US2016/019551, International Filing Date: Feb. 25, 2016; dated Jun. 1, 2016, pp. 1-13.

Tan et al. "3D entangled wire reinforced metallic composites", Materials Science and Engineering A 546, (2012) pp. 233-238.

Vesenjak, et al., "Characterization of irregular open-cell cellular structure with silicone pore filler", Polymer Testing 32 (2013) pp. 1538-1544.

International Preliminary Report of Patentability; International Application No. PCT/US2015/056811; International Filing Date: Oct. 22, 2015; dated May 23, 2017; pp. 1-8.

* cited by examiner

PERIODIC STRUCTURED COMPOSITE AND ARTICLES THEREFROM

BACKGROUND

Field of the Disclosure

This disclosure relates generally to periodic structured materials and systems that utilize same for downhole applications.

Background of the Art

Wellbores are drilled in subsurface formations for the production of hydrocarbons (oil and gas). Hydrocarbons are trapped in various traps or zones in the subsurface formations at different depths. During downhole operations, it is often desired to seal, isolate, and/or filter wellbore fluids. Such downhole operations often subject downhole equipment to extreme conditions, including high pressure and high temperature conditions. In such high pressure and high temperature conditions, conventionally formed materials including rubber and metal may break down and loose elasticity, or may not provide sufficient sealing performance. It is desired to provide a material that can withstand extreme conditions including high temperature and high pressure for downhole applications.

The disclosure herein provides periodic structured material and systems using the same to withstand downhole conditions.

SUMMARY

In one aspect, a material is disclosed, including: a periodic structure including a plurality of unit cells, the plurality of unit cells having a respective plurality of shared nodes, wherein each of the plurality of unit cells has a plurality of members forming an open cell volume and a matrix material associated with the periodic structure.

In another aspect, a method of forming a material is disclosed, including: forming a periodic structure including a plurality of unit cells, the plurality of unit cells having a respective plurality of shared nodes, wherein each of the plurality of unit cells has a plurality of members forming an open cell volume and associating a matrix material with the periodic structure.

In another aspect, a downhole system including a downhole element is disclosed including: a periodic structure including a plurality of unit cells, the plurality of unit cells having a respective plurality of shared nodes, wherein each of the plurality of unit cells has a plurality of members forming an open cell volume; and a matrix material associated with the periodic structure.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures, wherein like numerals have generally been assigned to like elements and in which.

DESCRIPTION OF THE EMBODIMENTS

Figure 1:
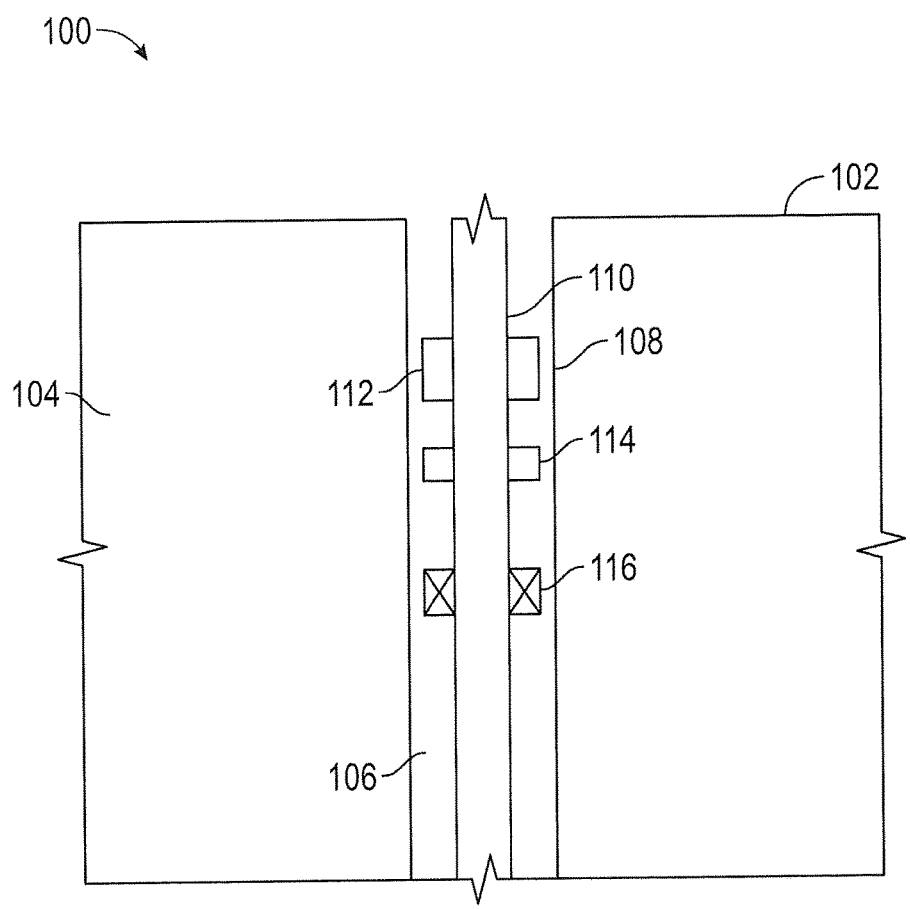
FIG. 1 is a schematic diagram of an exemplary drilling system that includes downhole elements according to embodiments of the disclosure.

FIG. 1 illustrates an exemplary downhole system for use in the production of oil and gas. The system 100 includes casing 110 disposed into a borehole 108 formed in formation 104. Borehole 108 is drilled into formation 104 to produce formation fluids from a downhole location 106 to the surface 102. A tubing member 110 is disposed within the wellbore 108 to facilitate downhole operations. In an exemplary embodiment, tubing member 110 is associated with filter element 112, seal 114, packer 116, or any combination thereof. In an exemplary embodiment, filter element 112, seal 114, packer 116, and other suitable components are used in any combination as downhole elements at any suitable stage of oil and gas operations. In certain embodiments, filter element 112 is used to filter a fluid used for or derived from oil and gas production. In certain embodiments, a seal 114 is used to separate and isolate a fluid, particularly downhole fluids, within certain areas. Seals 114 may include O-rings, seal rings, vee rings, chevron seals, backup rings and any other suitable seals. In certain embodiments, packer 116 includes an expandable sealing element to isolate portions of wellbore 108.

In certain downhole environments, filter element 112, seal 114, and packer 116 are subjected to high pressure and high temperature conditions. In exemplary embodiments, filter element 112, seal 114, and packer 116 utilize the periodic structures described herein to withstand high pressure and high temperature conditions, while allowing for performance characteristics such strength, sealing, and elasticity. In certain embodiments, seals, seal bore protectors, swabbing element protectors, components of a frac plug, bridge plugs, compression packing elements, expanding packing elements, O-rings, bonded seals, bullet seals, subsurface safety valve dynamic seals, subsurface safety valve flapper seals, V rings, backup rings, drill bit seals, or ESP seals can also utilize the period structures described herein.

Figure 2A:
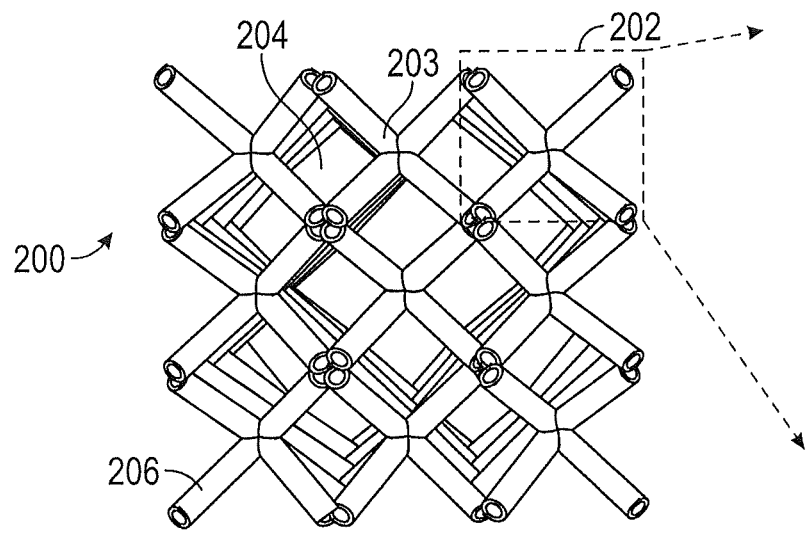
FIG. 2A shows a partial elevation view of an exemplary periodic structure, according to one embodiment of the disclosure.

FIG. 2A illustrates an exemplary periodic structure for use in downhole applications, such as for use in filter element 112, seal 114 and packer 116. In an exemplary embodiment, periodic structure 200 is formed of a plurality of unit cells 202 joined by shared nodes 203. In an exemplary embodiment, unit cells 202 is formed by members 206 forming open volumes 204. In an exemplary embodiment, periodic structure 200 can be formed with three-dimensional printing techniques, micromachining, photolithography, projection microstereolithograpy, and/or a layer-by-layer additive micromanufacturing process. In certain embodiments, periodic structure 200 is formed from a metal or alloy, such as stainless steel, aluminum, copper, brass, nickel, Inconel, a chemical resistant alloy, a shape memory alloy, or any other suitable metal or alloy. In other embodiments, periodic structure 200 is formed from ceramics, including, but not limited to alumina. In other embodiments, periodic structure 200 is formed from a polymer, including but not limited to HDDA and PMMA.

Figure 2B:
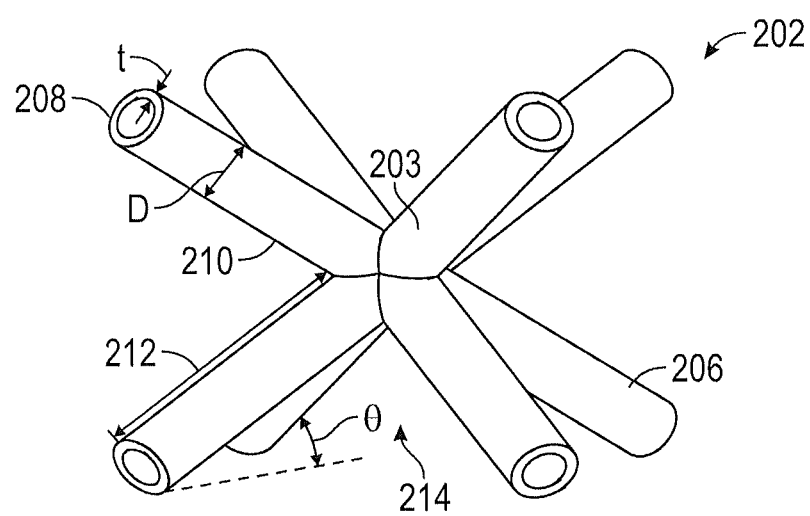
FIG. 2B shows a view of a unit cell of an exemplary periodic structure, such as the periodic structure shown in FIG. 2A.

FIG. 2B shows an exemplary embodiment of unit cell 202. In an exemplary embodiment, unit cell 202 forms together with other unit cells 202 via shared nodes 203 to form periodic structure 200. The unit cell 202 may be referred to as a representative volume element (RVE). In an exemplary embodiment, members 206 are joined together or formed together at shared node 203. Characteristics and arrangement of members 206 may determine the properties and characteristics of periodic structure 200.

In an exemplary embodiment, the geometry, configuration, and arrangement of members 206 creates an open cell design. In an exemplary embodiment, members 206 are hollow members that have a wall thickness t 208. In an exemplary embodiment, the wall thickness t 208 ranges from tens of nanometers to tens of microns (10 nanometers to 90 microns). In certain embodiments, members 206 are solid members. In an exemplary embodiment members 206 have an outer diameter 210. In an exemplary embodiment, the outer diameter 210 of members 206 ranges from tens of microns to millimeters (10 microns to 10 millimeters). In an exemplary embodiment, members 206 have a length 212. In an exemplary embodiment, the length 212 of members 206 ranges from hundreds of microns to millimeters (100 microns to 10 millimeters). In an exemplary embodiment, members 206 are oriented at an angle $\theta$ 214 relative to a horizontal plane to create a relative tilt for members 206.

In an exemplary embodiment, the parameters 208, 210, 212, and 214 of members 206 are modified to determine the characteristics of periodic structure 200. In an exemplary embodiment, the parameters 208, 210, 212, and 214 are optimized for high elasticity. Advantageously, by designing a highly elastic periodic structure 200, periodic structure 200 may effectively seal in downhole environments (such as high pressure, high temperature environments) while maintaining resistance to high pressure and high temperature due to material properties. In certain embodiments, the density and porosity of periodic structure 200 are modified. In other embodiments, parameters 208, 210, 212, and 214 are adjusted to create consistent open volumes to allow for selective permeability for enhanced filtration for downhole applications.

In an exemplary embodiment, parameters 208, 210, 212, and 214 are optimized utilizing finite element simulations. Such simulations may further alter porosity and density.

Figure 3:
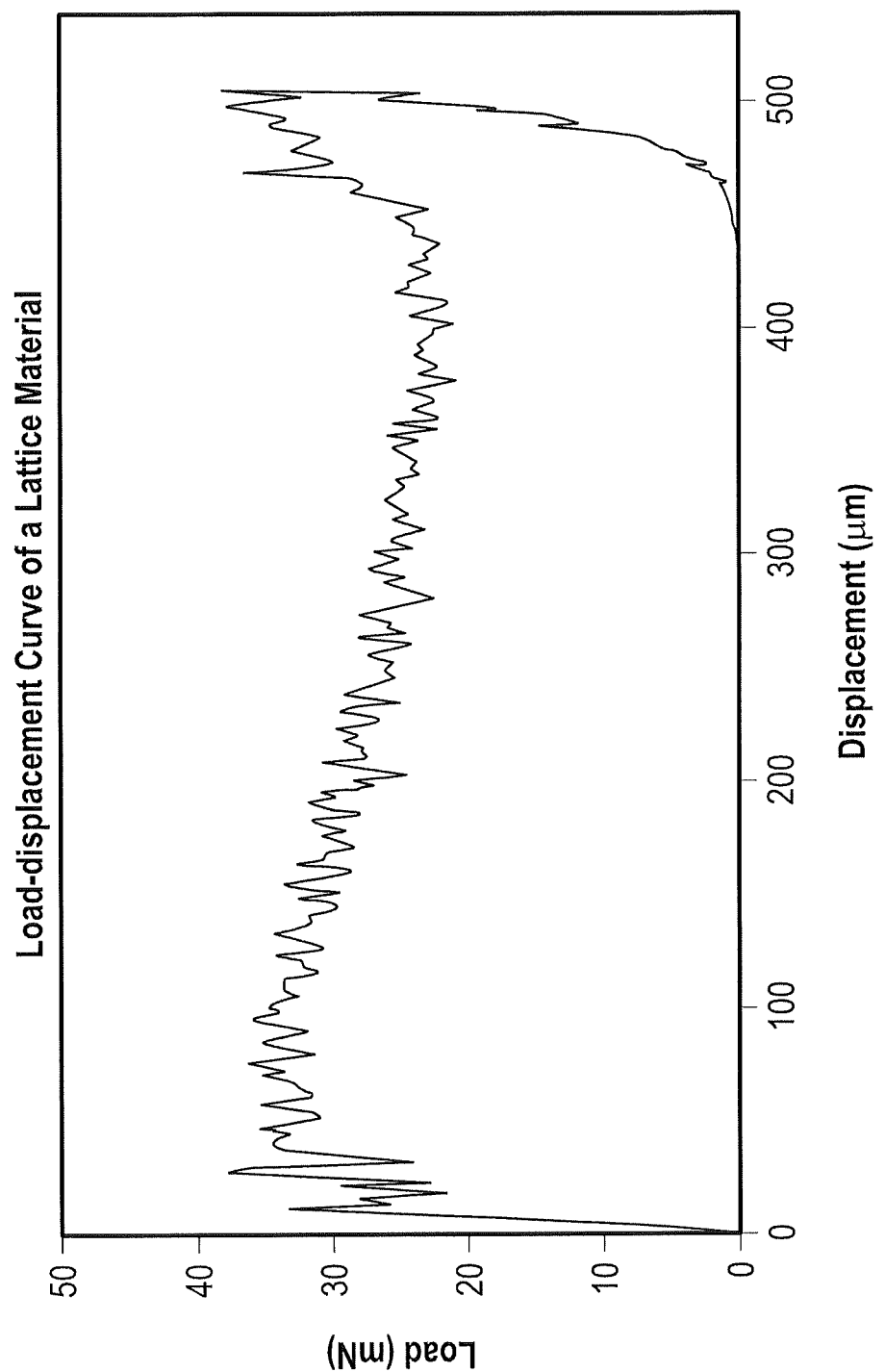
FIG. 3 shows a load displacement curve for an exemplary embodiment of the periodic structure.

FIG. 3 shows the load displacement curve for an exemplary embodiment of the periodic structure. As shown by the displacement in response to a load, the material generally requires the same force for the range of deformation shown in FIG. 3, indicating elastic behavior.

In other embodiments, members 206 are formed as coiled springs, double springs, diamonds, spherical hollow balls, or any other suitable member form. In certain embodiments, members 206 and unit cells 202 are formed in alternative arrangements, including but not limited to a three dimensional Kagome arrangement, a pyramid arrangement, or any other suitable arrangement. In certain embodiments, periodic structure 200 is modified to create a function graded structure by adding and removing desired members 206.

Figure 4A:
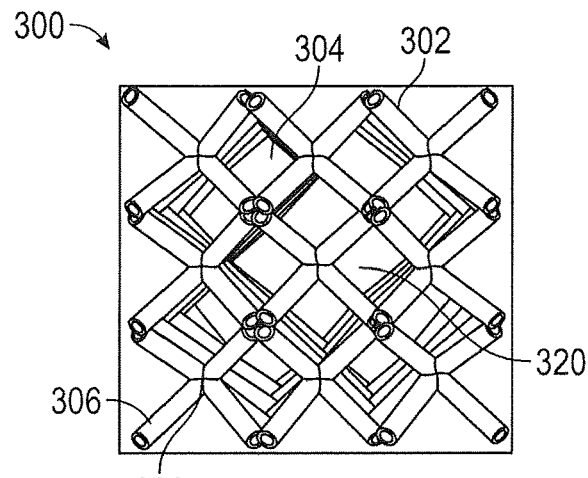
FIG. 4A shows an exemplary embodiment of a periodic structure with a matrix material.
Figure 4B:
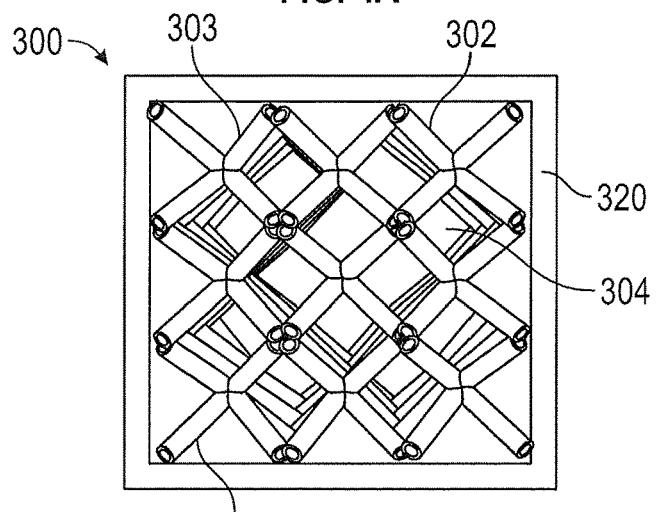
FIG. 4B shows an alternative embodiment of a periodic structure with a matrix material.
Figure 4C:
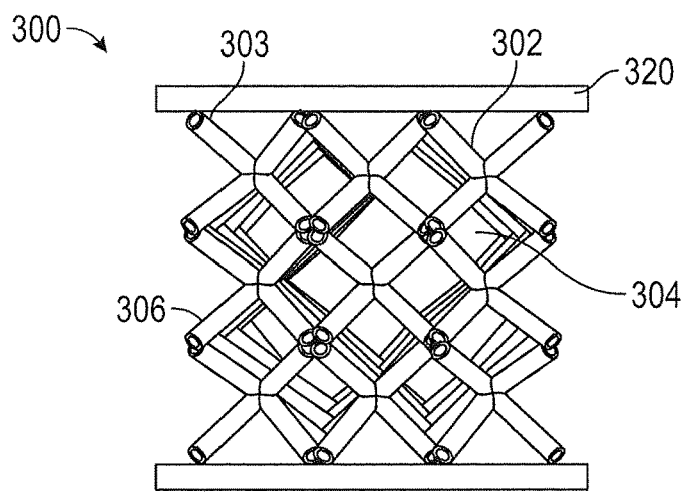
FIG. 4C shows an alternative embodiment of a periodic structure with a matrix material.

FIGS. 4A-4C show exemplary periodic structures including a matrix or secondary material. In FIG. 4A the periodic structure 300 is formed by a plurality of unit cells 302 with open volumes 304 filled with matrix material 320. Unit cells 302 may be formed by the joining of members 306 at shared nodes 303. In certain embodiments, matrix material 320 is a thermally set material, including, but not limited to epoxy, polyurethanes, and polyester. In certain embodiments, matrix material 320 is rubber, including, but not limited to NBR, HNBR, XNBR, EPDM, FKM, FEKM, FEPM, and FFKM. In certain embodiments, matrix material 320 is a thermoplastic, including, but not limited to nylon, polyethylene, synthetic rubbers, Teflon, nylon, ryton, and polycarbonates. In certain embodiments, matrix material 320 is a soft metal, including, but not limited to aluminum, copper, tin, and eutectic alloys. In other embodiments, matrix material 320, may be other suitable materials, including but not limited to cotton, asbestos, and fiberglass. In alternative embodiments, the matrix material 320 is any suitable composite material, including but not limited to composite materials with reinforcement fibers, the reinforcement fibers being oriented in short, long, or continuous fibers, beads, or balloons. In certain embodiments, the matrix material 320 is a porous material, wherein the porosity may be any suitable porosity.

In an exemplary embodiment, the matrix material 320 has similar or complimentary elastic properties of unit cell 302. Advantageously, matrix material 320 may enhance the sealing characteristics of periodic structure 300 while providing additional strength and rigidity. In an exemplary embodiment, matrix material 320 is impregnated into the open volumes 304 of material 300. In certain embodiments, powder infiltration is utilized to impregnate the open volumes 304 of material 300. In certain embodiments, plasticizers and lubricants are utilized during the manufacturing process to lower the viscosities of components utilized for both unit cell 302 and matrix material 320. In certain embodiments, secondary operations are utilized to remove such plasticizers and lubricants after the manufacturing process. In certain embodiments, suspensions with micro- or nano-size particles of the matrix material 320 are utilized. In certain embodiments, surfactants and other chemicals are removed after the manufacturing process. In certain embodiments, impregnated matrix material 320 and unit cells 302 are sintered at a suitable elevated temperature. Pressure may be applied based on the matrix material 320 and material of unit cell 302. In other embodiments, matrix material 320 is introduced into material 300 via injection molding, compression molding, extrusion molding, brazing, casting, vapor deposition, electrochemical deposition, etc. Binders in the form of particles, fibers, or other shape may be mixed with matrix material 320 in certain ratios to facilitate bonding between the unit cells 302 and matrix material 320.

In an exemplary embodiment, a plurality of unit cells 302 are coated with a coupling agent to facilitate the adhesion of matrix material 320. Coupling agents may include adhesives. Other methods of promoting adhesion may include, but are not limited to mechanical entanglement, surface treatment, and surface roughening. Adhesion between unit cells 302 and matrix material 320 facilitates transferring loads between matrix material 320 and the periodic structure of material 300. Advantageously, optimum adhesion allows for compatibility and integrity of the different materials of matrix material 320 and the materials used for unit cells 302 under loading conditions. Weak interfacial adhesion may not be sufficient for load distribution and transformation as delamination or cracks may occur and destroy the integrity of the composite, while excessive interfacial adhesion may lead to a rigid composite, which compromises the elasticity of the periodic structure.

In other embodiments, unit cells 302 are surface treated to promote adhesion with matrix material 320. In certain embodiments unit cells 320 chemically treated to increase surface roughness to promote adhesion with matrix material 320. Chemicals for treatment may include, but are not limited to organofunctional silanes, or any other suitable chemical. Other surface treatments may be used to create non-smooth interfaces between unit cells 302 and matrix material 320. In other embodiments, unit cells 302 and matrix material 320 are brazed together.

After periodic structure 300 is formed, the structure 300 may be heat treated to reduce residual stress and/or remove defects. Residual stresses may exist due to differences in thermal expansion coefficients and due to shrinkage during curing or solidification of matrix material 320. In certain embodiments, residual stresses and defects may be released through post treatments, including, but not limited to, aging, tempering, etc.

In an exemplary embodiment, matrix material 320 occupies the space designated as a free volume 304. Advantageously, the inclusion of matrix material 320 may modify the characteristics and properties of periodic structure 300 by adjusting the density and porosity of the periodic structure 300, while enhancing the sealing characteristics of periodic structure 300. Further, since the plurality of unit cells 302 support any loading, due to the shape and design of parameters as described above, the matrix material 320 is not required to support the loading as well. In an exemplary embodiment, matrix material 320 transfers and distributes load experienced by periodic structure 300. Advantageously, since matrix material 320 is not required to support loading forces, more cost effective materials may be used as a matrix material 320, while still achieving desired sealing characteristics compared to other advanced or more costly materials.

Additionally, due to the structure and strength provided by unit cells 302, forces that may typically result in extrusion of matrix material 320 are avoided. In an alternative embodiment, matrix material 320 only partially occupies the space designated as a free volume 304. In certain embodiments, the matrix material may occupy any suitable portion of free volume 304. Advantageously, by either altering the porosity or percentage occupied by matrix material 320 in free volume 304, the properties of materials 300 are significantly altered. In certain embodiments, the porosity or percentage occupied by matrix material 320 in free volume 304 can affect the overall compliance, sealing ability, filtration ability, strength, and other material properties.

In exemplary embodiments, the composition of material 300 can vary based on intended applications. In certain embodiments, material 300 is used for filtration applications. For filtration applications, effective porosity of material 300 is adjusted based on parameters, including but not limited to permeability requirements, media size (i.e. sand size), etc. In certain embodiments, material 300 is composed of 5% to 95% unit cells 302 and 80% to 0% matrix material 320. In certain embodiments, matrix material 320 occupies 0% to 80% of open or free volume 304. In certain embodiments, the matrix material 320 is porous.

In certain embodiments, material 300 is used for sealing applications. For sealing applications, properties of material 300 are adjusted based on parameters, including but not limited to load capacity, required elasticity, etc. In certain embodiments, material 300 is composed of 5% to 95% unit cells 302 and 95% to 5% matrix material 320. In certain embodiments, matrix material 320 occupies 5% to 96% of open or free volume 304.

In FIG. 4B, matrix material 320 is associated with unit cells 302. In an exemplary embodiment, as shown, the matrix material 320 is disposed about the outer extents of the periodic structure 300 without occupying open volume 304. Advantageously, the matrix material 320 is disposed about the outer extents to provide enhanced sealing performance while allowing a load to be supported. Further, the amount of matrix material 320 is reduced allowing for weight and cost savings.

In FIG. 4C, matrix material 320 is shown at the upper and lower extents of the plurality of unit cells 302. Similarly, such an arrangement allows for advantageous sealing properties, while supporting load along an interface in a desired direction. Further, selective flow may be to pass through the unobstructed extents of the material 300. Further, the amount of matrix material 320 is reduced allowing for weight and cost savings.

Therefore in one aspect, a material is disclosed, including: a periodic structure including a plurality of unit cells, the plurality of unit cells having a respective plurality of shared nodes, wherein each of the plurality of unit cells has a plurality of members forming an open cell volume; and a matrix material associated with the periodic structure. In certain embodiments, each member of the plurality of members is selected from a group consisting of: a hollow tubular member, a solid tubular member, a coil spring member, a double spring member, a diamond member, and a spherical hollow member. In certain embodiments, the periodic structure is formed by a process comprising of at least one of: three-dimensional printing techniques, micromachining, photolithography, projection microstereolithograpy, a layer-by-layer additive, and micromanufacturing process. In certain embodiments, the periodic structure comprises at least one of: stainless steel, aluminum, copper, brass, nickel, Inconel, a chemical resistant alloy, a shape memory alloy, alumina, HDDA, and PMMA. In certain embodiments, the matrix material is porous. In certain embodiments, the matrix material occupies 0% to 80% of the open cell volume of the plurality of unit cells. In certain embodiments, the matrix material occupies 5% to 100% of the open cell volume of the plurality of unit cells. In certain embodiments, the matrix material is associated with at least one outer extent of the periodic structure. In certain embodiments, the matrix material comprises at least one of: thermal setting materials, rubbers, thermoplastics, soft metals, graphite, cotton, asbestos, and fiber glass. In certain embodiments, the periodic structure is treated to increase adhesion with the matrix material. In certain embodiments, a periodic structure elasticity and a matrix material elasticity are complimentary.

In another aspect, a method of forming a material is disclosed, including: forming a periodic structure including a plurality of unit cells, the plurality of unit cells having a respective plurality of shared nodes, wherein each of the plurality of unit cells has a plurality of members forming an open cell volume; and associating a matrix material with the periodic structure. In certain embodiments, further including selecting each member of the plurality of members from a group consisting of: a hollow tubular member, a solid tubular member, a coil spring member, a double spring member, a diamond member and a spherical hollow member. In certain embodiments, the matrix material is porous. In certain embodiments, the matrix material occupies the open cell volume of the plurality of unit cells. In certain embodiments, the matrix material is associated with at least one outer extent of the periodic structure. In certain embodiments, the matrix material is associated with periodic structure via at least one of: powder infiltration and sintering, compression molding, injection molding, extrusion molding, vacuum infiltration, vapor deposition, electrochemical deposition, casting, and brazing. In certain embodiments, further including applying a plasticizer, a lubricant, or a surfactant to facilitate associating the matrix material with the periodic structure. In certain embodiments, further including removing the plasticizer, the lubricant, or the surfactant from the periodic structure. In certain embodiments, further including treating the periodic structure or the matrix material via applying a coupling agent, mechanical entanglement, surface treatment, surface roughening, and applying a binder in the matrix material. In certain embodiments, further including heat treating the material.

In another aspect, a downhole system including a downhole element is disclosed including: a periodic structure including a plurality of unit cells, the plurality of unit cells having a respective plurality of shared nodes, wherein each of the plurality of unit cells has a plurality of members forming an open cell volume; and a matrix material associated with the periodic structure. In certain embodiments the matrix material is porous. In certain embodiments, the downhole element is a sealing element. In certain embodiments, the downhole element is a filter element.

The foregoing disclosure is directed to certain specific embodiments for ease of explanation. Various changes and modifications to such embodiments, however, will be apparent to those skilled in the art. It is intended that all such changes and modifications within the scope and spirit of the appended claims be embraced by the disclosure herein.

The invention claimed is:

1. A downhole system, comprising:
a filter element including:
   a periodic structure including a plurality of unit cells, the plurality of unit cells having a respective plurality of shared nodes, wherein each of the plurality of unit cells has a plurality of members forming an open cell volume;
   a matrix material filling the open cell volume formed by the periodic structure, the matrix material including a mixture of soft metal and fiber binders, wherein the matrix material is porous; and
   an adhesive layer for coupling the matrix material to the periodic structure that transfers load between the matrix material and the periodic structure.

2. The downhole system of claim 1, wherein each member of the plurality of members is selected from a group consisting of: a hollow tubular member, a solid tubular member, a coil spring member, a double spring member, a diamond member, and a spherical hollow member.

3. The downhole system of claim 1, wherein the periodic structure is formed by a process comprising of at least one of: three-dimensional printing techniques, micromachining, photolithography, projection microstereolithograpy, a layer-by-layer additive, and micromanufacturing process.

4. The downhole system of claim 1, wherein the periodic structure comprises at least one of: stainless steel, aluminum, copper, brass, nickel, Inconel, a chemical resistant alloy, a shape memory alloy, alumina, hexanediol diacrylate (HDDA), and polymethyl(methylacrylate) (PMMA).

5. The downhole system of claim 1, wherein the matrix material occupies 5% to 100% of the open cell volume of the plurality of unit cells.

6. The downhole system of claim 1, wherein the matrix material is associated with at least one outer extent of the periodic structure.

7. The downhole system of claim 1, wherein the matrix material comprises at least one of: a thermosetting material, a rubber, a thermoplastic material, graphite, cotton, asbestos, and fiber glass.

8. The downhole system of claim 1, wherein the periodic structure is treated to increase surface roughness to promote adhesion with the matrix material.

9. The downhole system of claim 1, wherein a periodic structure elasticity and a matrix material elasticity are complimentary.

* * * * *